(12) United States Patent
Whaley

(10) Patent No.: US 6,710,490 B1
(45) Date of Patent: Mar. 23, 2004

(54) HEAT BRIDGES FOR ELECTRIC MOTOR GEAR CASE

(75) Inventor: Kenneth N. Whaley, Franklin, WI (US)

(73) Assignee: Fasco Industries, Inc., Cassville, MO (US)

( * ) Notice: Subject to any disclaimer, the term of this patent is extended or adjusted under 35 U.S.C. 154(b) by 127 days.

(21) Appl. No.: 09/890,828

(22) PCT Filed: Dec. 5, 2000

(86) PCT No.: PCT/US00/32933

§ 371 (c)(1),
(2), (4) Date: Aug. 6, 2001

(87) PCT Pub. No.: WO01/43260

PCT Pub. Date: Jun. 14, 2001

Related U.S. Application Data

(60) Provisional application No. 60/169,542, filed on Dec. 7, 1999.

(51) Int. Cl.$^7$ ................................ H02K 49/00
(52) U.S. Cl. ........................ 310/99; 310/64; 310/89; 310/260
(58) Field of Search ................. 310/99, 83, 89, 310/64, 43, 44, 260, 40 MM

(56) References Cited

U.S. PATENT DOCUMENTS

| | | | | |
|---|---|---|---|---|
| 3,688,137 A | * | 8/1972 | Filhol | 310/43 |
| 5,682,074 A | * | 10/1997 | Di Pietro et al. | 310/215 |
| 5,723,933 A | * | 3/1998 | Grundl et al. | 310/266 |
| 6,020,661 A | * | 2/2000 | Trago et al. | 310/43 |
| 6,169,345 B1 | * | 1/2001 | Bloch et al. | 310/67 R |
| 6,201,321 B1 | * | 3/2001 | Mosciatti et al. | 310/43 |
| 6,355,996 B1 | * | 3/2002 | Birkestrand | 310/54 |
| 6,577,030 B2 | * | 6/2003 | Tominaga et al. | 310/68 B |

* cited by examiner

*Primary Examiner*—Thanh Lam
(74) *Attorney, Agent, or Firm*—Andrus, Sceales, Starke & Sawall, LLP

(57) ABSTRACT

A method and apparatus for dissipating heat from electric motors. Small electric motors often operate at undesirably high temperatures and are often mounted to gear cases. To reduce the temperature a thermally conductive gap filling material is compressed between the winding heads of the stator and the mating surface of motor and gear case. The gear case functions as a heat sink for the stator windings. Additional heat sinks may be mounted on the motor housing using additional thermally conductive gap filling material compressed between the other winding heads and the cover.

6 Claims, 4 Drawing Sheets

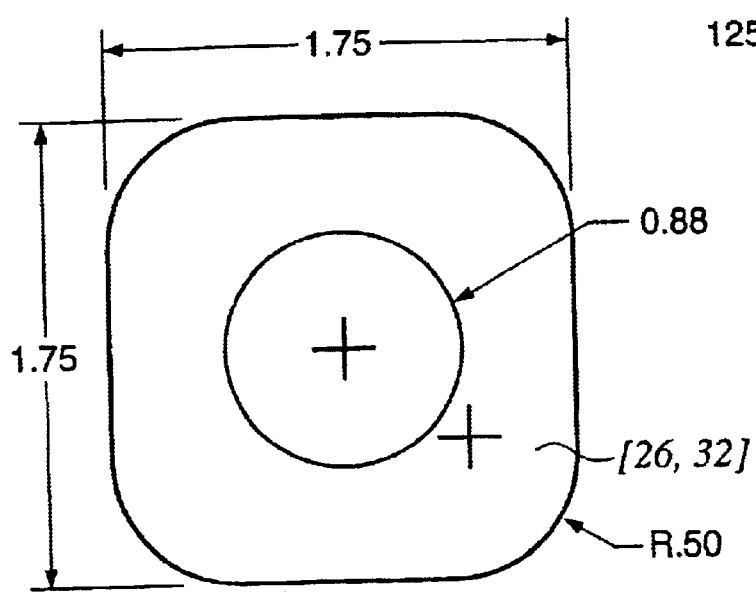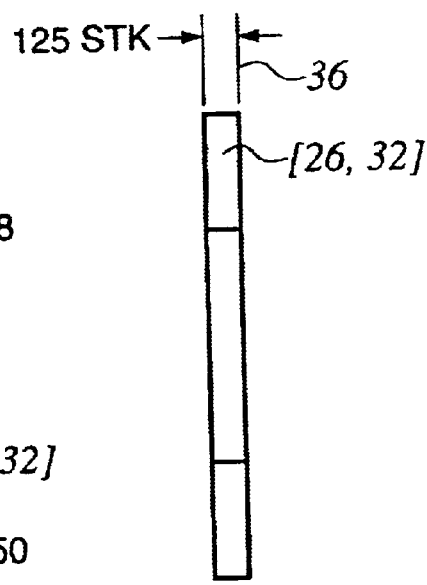
FIG. 4    FIG. 5

HEAT BRIDGES FOR ELECTRIC MOTOR GEAR CASE

CROSS-REFERENCE TO RELATED APPLICATION

The present invention is based on and claims priority to U.S. Provisional Patent Application Ser. No. 60/169,542 filed on Dec. 7, 1999 and is a national stage application of PCT International Application No. PCT/US00/32933 published in English on Jun. 14, 2001 as Publication No. WO 01/43260.

TECHNICAL FIELD

The present invention relates to electric motor systems and more particularly to heat transfer methods in electric motor systems.

BACKGROUND ART

In a large number of electric motor applications, it is desirable to minimize heat retained in an electric motor. Maximum temperature rise specifications are prescribed for many applications by government and private regulatory agencies. Agencies such as Underwriters Laboratories specify maximum temperature rise limits for product applications as a requirement for agency listing or recognition of a product. Many consumer product manufacturers will not purchase components or products that are not listed or recognized by specific agencies, particularly Underwriters Laboratories. Therefore, the market viability of many products depends on the produces compliance with Underwriters Laboratory requirements.

It is known that smaller electric motors typically run hotter than larger motors in specific applications. Accordingly, it is known to provide a larger motor or a motor having a higher performance where applications using a smaller motor or a motor having lower performance fails to comply with heat rise specifications. For example, in the medical equipment industry, it is known that certain small motors have been heretofore unsuitable for use in hospital type beds and assisted chairs because the small motors fail to meet relatively low, for example 100° C., Underwriters Laboratory heat rise requirement it is known to employ larger or higher performance motors that run cooler in such applications in order to meet the Underwriters Laboratory temperature rise requirement Such larger or higher performance motors are typically more expensive than smaller or lower performance motors.

It is known to provide heat sink components to radiate excess heat generated by many electronic and mechanical devices. Such heat sink components typically comprise a large surface area that is mounted directly against a surface area of a device to maximize heat transfer from the device to the heat sink. It is common practice in the electronic industry to provide a compliant gap filling substance between heat sink components and the device to which the heat sink is mounted to further promote heat transfer away form the device.

DISCLOSURE OF THE INVENTION

Accordingly, it is a primary advantage of the present invention to provide an improved method of heat transfer in electric motors by employing a thermally conductive gap filler between a motor windings end surface and a matin surface of a gear case. The method of the invention allows improved heat transfer away from the motor coils and allows a gear case to function as a heat sink.

An additional heat sink which may be mounted to an opposite end of a motor similarly using a thermally conductive gap filler between the heat sink and the motor windings surface provides additional heat transfer away from the motor. Additional heat transfer can be accomplished through the addition of a conductive gap filler. A conductive gap filler "liquid form heat transfer compound" is placed into the gap between the motor and the motor lamination stack.

The heat transfer method of the present invention provides sufficient additional cooling to an electric motor so that a small or low performance inexpensive motor complies with the Underwriters Laboratory heat rise specification for use in hospital type beds and assisted chairs.

It is to be understood that various changes can be made by one skilled in the art in one or more of the several parts of the invention described herein without departing from the scope of the invention.

BRIEF DESCRIPTION OF DRAWINGS

FIG. 4 is a plan view of a thermal pack according to at least one embodiment of the present invention.

FIG. 5 is a side view of a thermal; pad according to at least one embodiment of the present invention.

MODES FOR CARRYING OUT THE INVENTION

Figure 1:
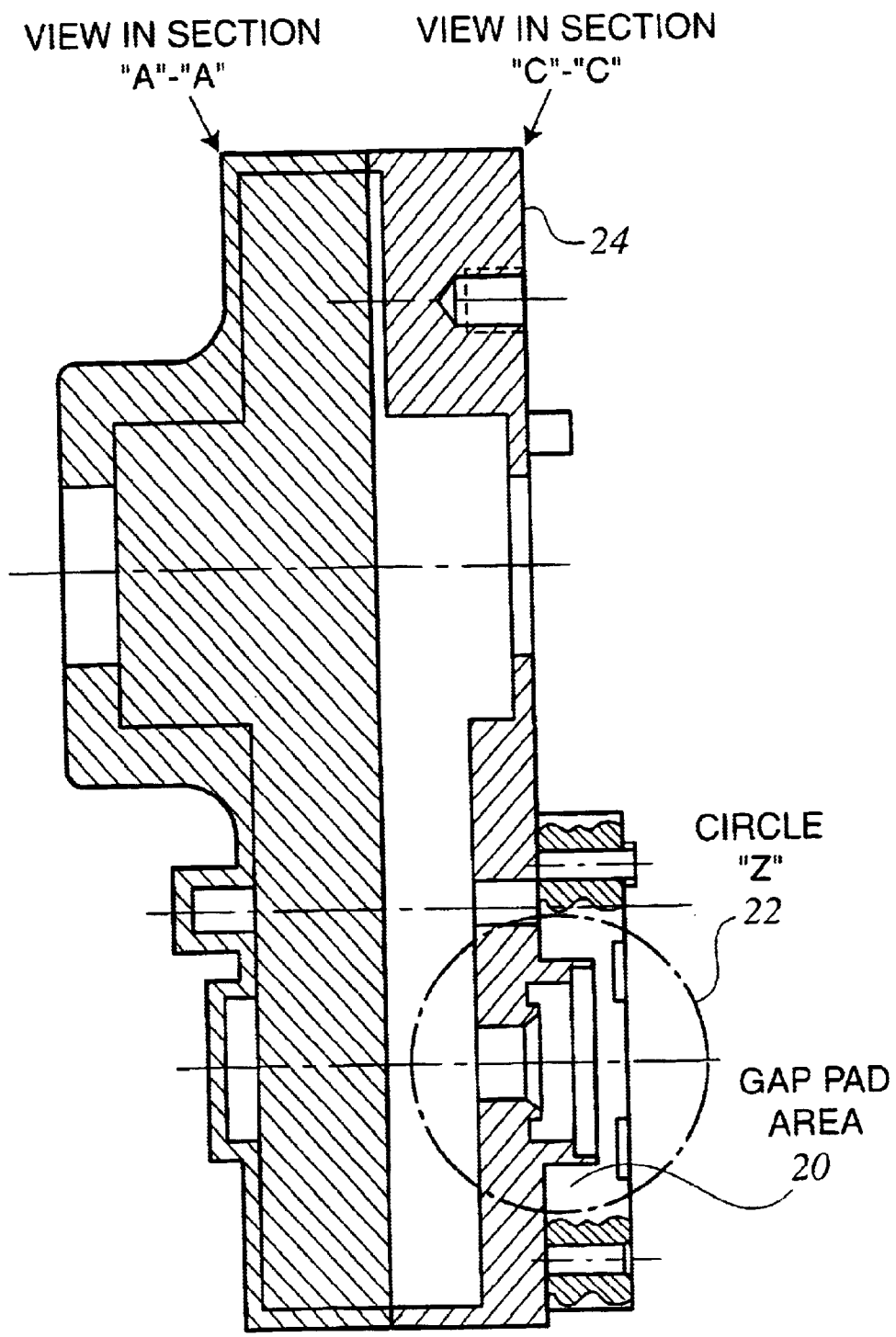
FIG. 1 is a side section view of a gear case of at least one embodiment of the present invention.
Figure 2:
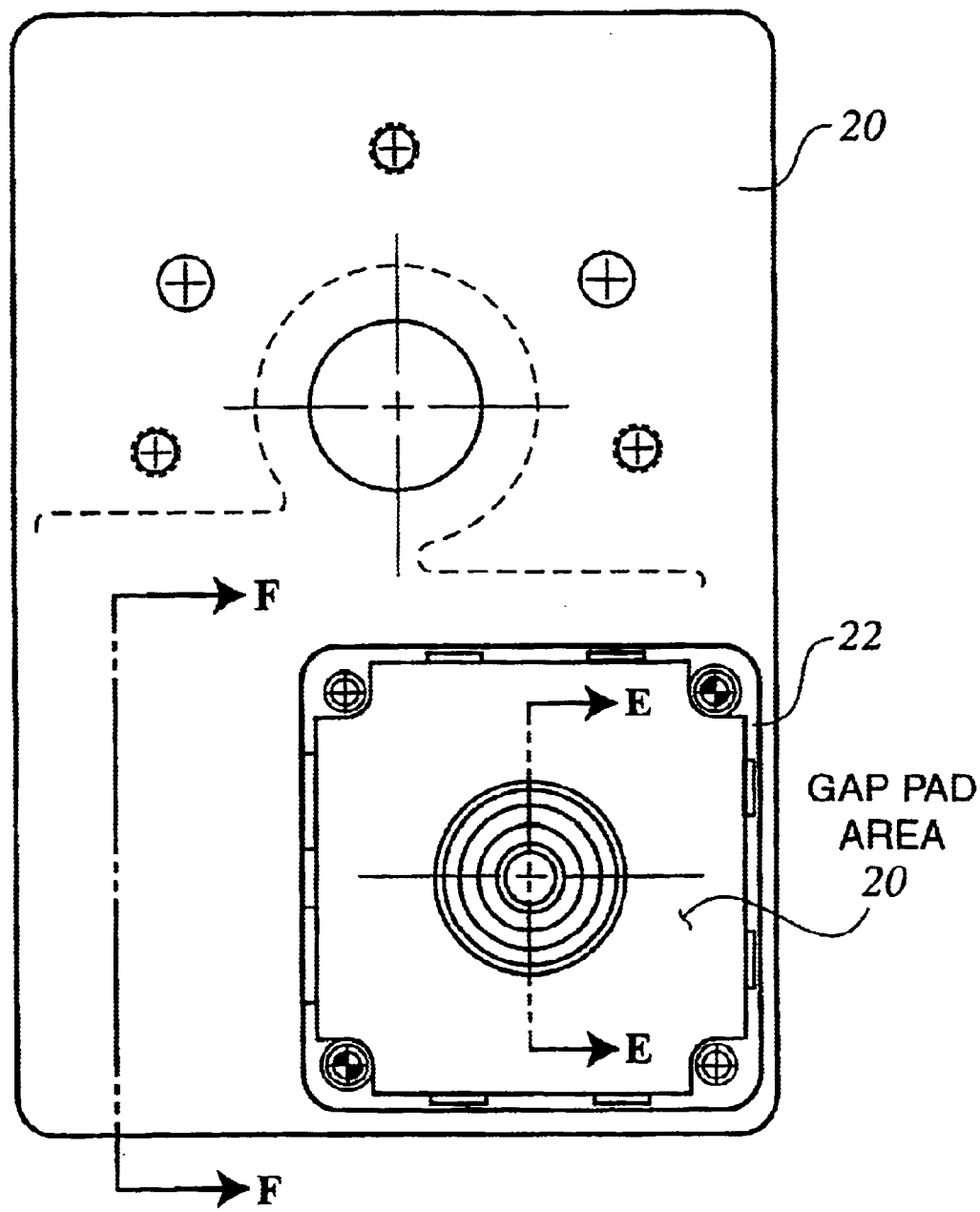
FIG. 2 is a front plan view of a gear case of at least one embodiment of the present invention.

Referring to FIG. 1 that discloses a sectioned side view of a gear case 24 according to the present invention, a gap pad area 20 can be seen within a motor mounting area 22 which is capable of receiving one end of an electric motor where motor windings of the electric motor contact the gear case and a gap pad. Referring to FIG. 2, a front view of the gap pad area 20 and motor mounting area 22 of a gear case according to at least one embodiment of the present invention can be seen.

Figure 3:
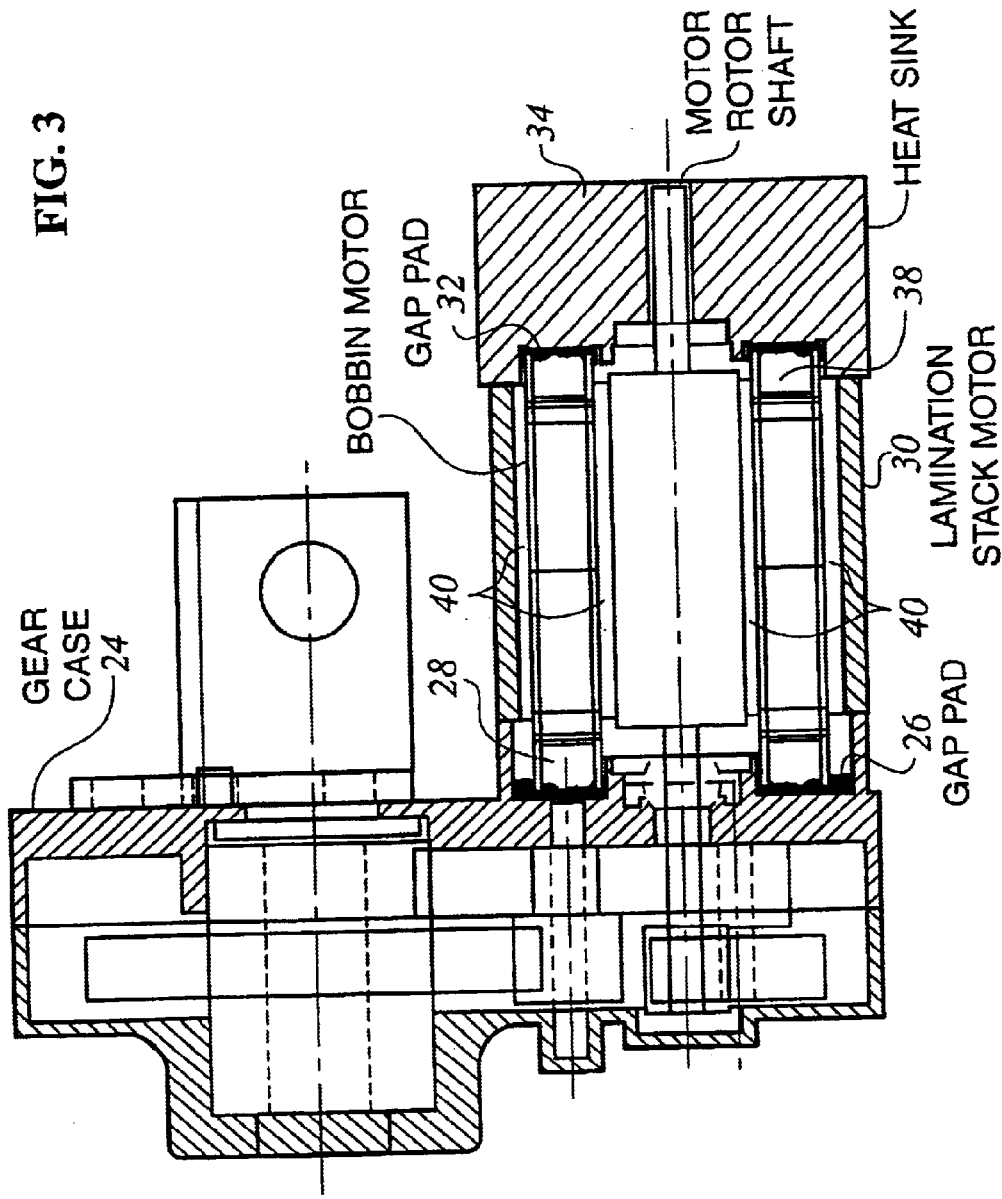
FIG. 3 is a side section view of a motor and gear case of at least one embodiment of the present invention including a heat sink and two thermal pads.

Referring to FIG. 3 which discloses a sectioned side view of an electric motor 30, two gap pads 26, 32 and a heat sink 34 according to at least one embodiment of the present invention: a first gap pad 26 can be seen installed between the gear case 24 and a first windings end 28 of an electric motor 30. Further displayed in FIG. 3 is a motor gap 40 that is optionally filled with liquid conductive gap filler forming an intimate contact with the motor and the lamination stack further enhancing heat transfer.

A front view of a gap pad 26, 32 according to at least one embodiment of the present invention is show in FIG. 4. A side view of a gap pad 26, 32 according to at least one embodiment of the present invention is shown in FIG. 5. In the preferred embodiment each gap pad comprises a high performance thermally conductive gap filling material with a thermal conductivity rate at 10 psi of about 3.0 W/m-K, A specific preferred material is supplied by the Bergquist Company and referred to by the trade name Gap Pad '3000. The gap pads as used in a preferred embodiment of the present invention have a thickness 36 of about 125 inches.

Mechanical fasteners, typically bolts, secure a motor 30 to a gear case 24 and compress a gap pad 26 in the gap pad area 20 so that a maximum thermal surface is maintained between the motor first windings end surface 28 and the gear case 24.

A heat sink 34 may be secured to a motor second end surface 38 whereby a second gap pad 32 is compressed in a second gap pad area between the heat sink 34 and the motor second windings end surface 38 so that a maximum thermal surface is maintained to facilitate a maximum heat flow between the motor second end and the heat sink 34.

The preferred embodiment of the invention employs a permanent split capacitor motor for application with a gear case to operate hospital type beds and assisted chairs. However the heat transfer method of the invention may be applied to any number of motor designs and applications.

Having thus described my invention, what I claim as new and desire to secure by United States Letters Patent is:

I claim:

1. A mechanical drive apparatus comprising:
   at least on electric motor having a first winding end surface and a second winding end surface;
   a gear case having gears wherein at least one said electric motor provides rotation to said gears and having a mating area wherein said mating area is affixed to said first windings end surface;
   a list gap pad space between said first windings end surface and said mating area;
   a first gap pad comprised of thermally conductive gap filling material in said first gap pad space and compressed between said first windings end surface and said mating area.

2. The mechanical drive apparatus according to claim 1 further comprising:
   a heat sink having a mating area capable of accepting said second windings end surface and matingly attached thereto;
   a second gap pad space between said heat sink mating area and said second windings end surface;
   a second gap pad comprised of thermally conductive gap filling material in said second gap pad space and compressed between said heat sink mating area and said second windings end surface.

3. The mechanical drive apparatus according to claim 1 wherein said thermally conductive gap filling material is a compliant polymer of high thermal conductivity.

4. The mechanical drive apparatus according to claim 1 wherein said thermally conductive gap filling material is a Bergquist Gap Pad Tm 3000.

5. A mechanical drive apparatus according to claim 4 wherein said thermally gap filling material has a thickness of 0.125 inches.

6. The mechanical drive apparatus according to claim 1 further comprising
   a liquid heat transfer compound;
   a motor lamination stack wherein said liquid heat transfer compound is in intimate thermal communication between said motor and said motor lamination stack.

* * * * *